(12) United States Patent
Scheller (10) Patent No.: US 9,292,230 B2
(45) Date of Patent: Mar. 22, 2016

(54) PRINT MANAGEMENT SYSTEMS

(75) Inventor: Volker Heinrich Scheller, Osnabruck (DE)

(73) Assignee: CANON EUROPA N.V., Amstelveen (NL)

( * ) Notice: Subject to any disclaimer, the term of this patent is extended or adjusted under 35 U.S.C. 154(b) by 75 days.

(21) Appl. No.: 13/106,735

(22) Filed: May 12, 2011

(65) Prior Publication Data

US 2011/0279861 A1 Nov. 17, 2011

Related U.S. Application Data

(60) Provisional application No. 61/334,968, filed on May 14, 2010.

(51) Int. Cl.
*G06K 15/02* (2006.01)
*G06F 3/12* (2006.01)

(52) U.S. Cl.
CPC .............. *G06F 3/1203* (2013.01); *G06F 3/126* (2013.01); *G06F 3/1272* (2013.01); *G06F 3/1287* (2013.01); *G06F 3/1288* (2013.01)

(58) Field of Classification Search
CPC ... G06K 15/02; G06K 15/40; G06K 15/4065; G06K 15/002; G06K 15/007; G06K 15/4025; G06K 15/005; G06K 15/18; G06K 15/1805; G06K 15/1828; G06K 15/1888; G06K 15/401; G06K 15/4045; G06K 15/4055

USPC ......................................................... 358/1.15
See application file for complete search history.

(56) References Cited

U.S. PATENT DOCUMENTS

| 2003/0223094 | A1* | 12/2003 | Naito | .................... | G06F 3/1204 |
| | | | | | 358/1.15 |
| 2004/0267725 | A1* | 12/2004 | Harik | ................................ | 707/3 |
| 2005/0162689 | A1* | 7/2005 | Roztocil | ............... | G06F 3/1203 |
| | | | | | 358/1.15 |
| 2006/0221359 | A1* | 10/2006 | Mokuya | ........................ | 358/1.1 |
| 2009/0225360 | A1* | 9/2009 | Shirai | ......................... | 358/1.15 |

* cited by examiner

*Primary Examiner* — King Poon
*Assistant Examiner* — Andrew H Lam
(74) *Attorney, Agent, or Firm* — Canon USA, Inc. IP Division (57) ABSTRACT

A print-management system comprises a plurality of web-submission servers and a print server. Each web-submission server hosts a website configured to allow submission of print jobs to the print management system. The print server is configured to receive print jobs from the plurality of web-submission servers, process the print jobs, and send print jobs to at least one printer to be printed. The print management system is configured to add an identifier to each received print job to identify the web-submission server or website that received the print job. The print server is configured so that print jobs are processed based on the identifiers added to the print jobs.

11 Claims, 11 Drawing Sheets

| Symbol | Description |
|---|---|
|  | Gives you further filter possibilities. To close the filter dialog, just click this symbol again.<br><br>Depending on the configuration of a queue and its filter criteria, the queues will show the matching jobs. So each queue contains already filtered jobs. With the filter symbol you can filter all job ticket fields and job properties which are defined as a queue column in the queue configuration. The filter can be seen as a "sub-filter" to the "queue filter". |
|  | Closes the filter window and clears the input boxes of the filter. |
|  | Selects all jobs from the displayed page of a queue |
|  | Deselects all selected jobs of a table. |

PRINT MANAGEMENT SYSTEMS

CROSS REFERENCE TO RELATED APPLICATIONS

This application claims the benefit of U.S. Provisional Patent Application No. 61/334,968, filed on May 14, 2010, which is hereby incorporated by reference herein in its entirety.

BACKGROUND OF THE INVENTION

The present invention concerns improvements to print management systems.

Figure 1:
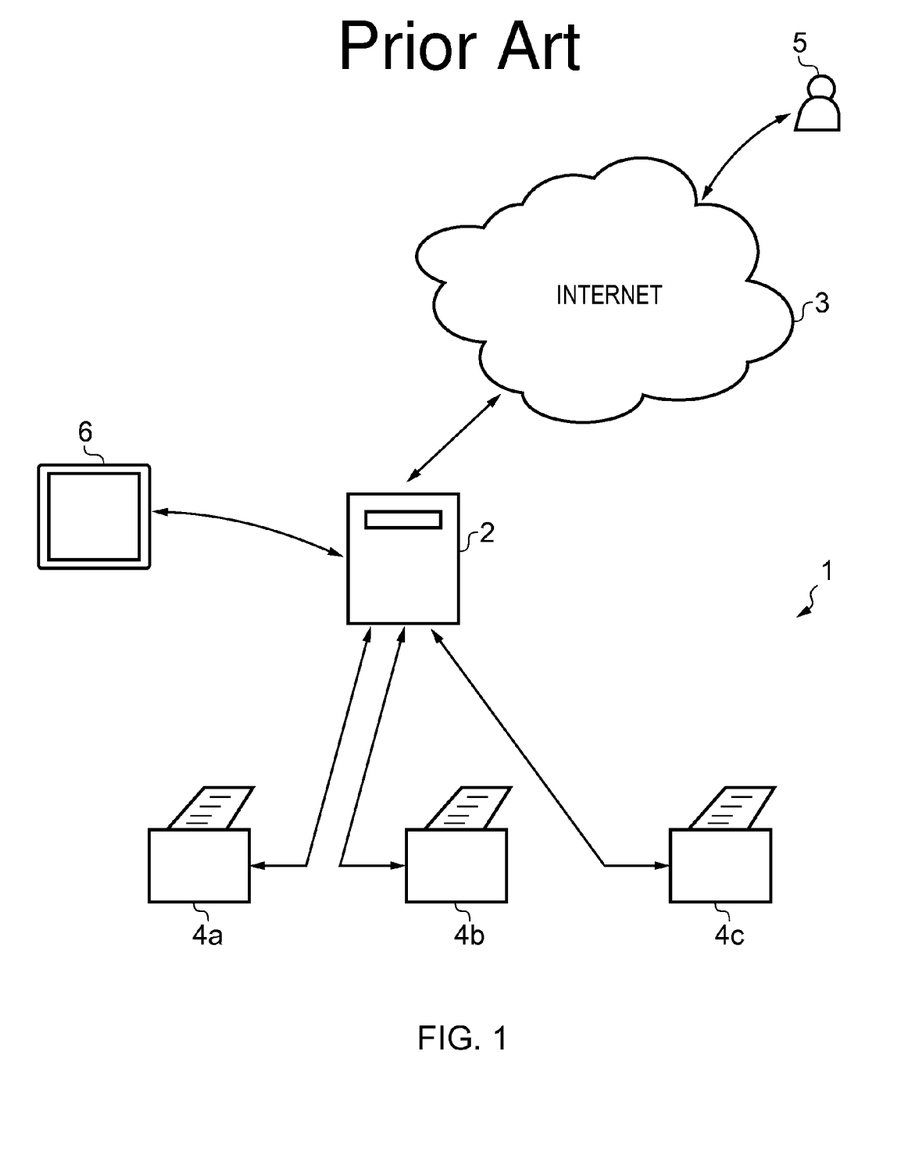
FIG. 1 shows the configuration of a prior art printing system.

A known print management system 1 is shown in FIG. 1. The print management system 1 comprises a print server 2 in direct communication with the Internet 3. The print server 2 is also in direct communication with a number of print devices 4a, 4b, 4c.

In use, the print server 2 receives print jobs from a customer 5 via the Internet 3. For example, the print server 2 may be operable as a web server, and be arranged to provide an interface in the form of a "shop front" by which a customer can upload a document to be printed and select various printing options (for example to print on a particular colour paper). From a customer's perspective a "shop front" is a web site that can be used to request printing services and printed products. The document to be printed, together with the various printing options stored in a job ticket, is known collectively as the print job.

Once it has received a print job, the print server 2 manages the printing of the print job by one or more of the print devices 4a, 4b, 4c. In some cases, an operator terminal 6 is provided in direct communication with the print server 2, to allow a print shop operator to monitor and modify incoming print jobs, for example to select on which print device 4a, 4b, 4c different parts of the print job are to be printed, to correct obvious errors in the printing options, or to confirm that a particular print job is to be accepted for printing.

Figure 2:
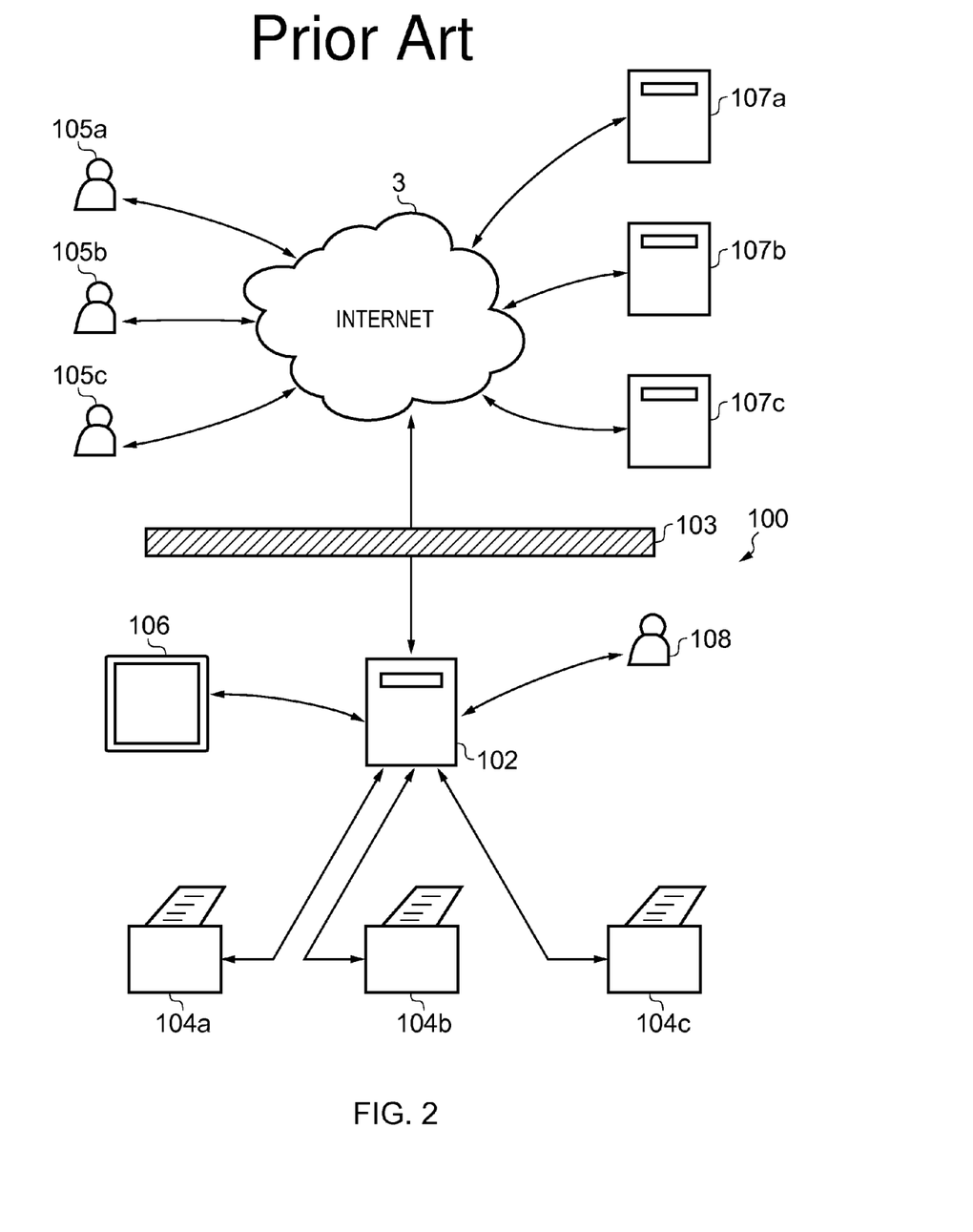
FIG. 2 shows the configuration of a second prior art printing system.

A second prior art system is shown in FIG. 2. FIG. 2 shows a print management system 100. The print management system 100 comprises a print server 102 in communication, via a firewall 103, with the Internet 3. The print server 102 is in communication with a number of print devices 104a, 104b, 104c via a network. The print management system 100 also comprises an operator terminal 106 in communication with the print server 102 either directly or via a network. A user 108 is in direct communication with the print server 102.

SUMMARY OF INVENTION

Description of Web-Submission Servers

Web-submission servers 107a, 107b, 107c, which are operable as web servers, are in direct communication with the Internet 3. Customer's computers (hereinafter "clients") 105a, 105b, 105c are also in direct communication with the Internet 3. The web-submission servers 107 are provided to host websites to allow clients 105 to submit print jobs to the print management system 100.

Figure 3:
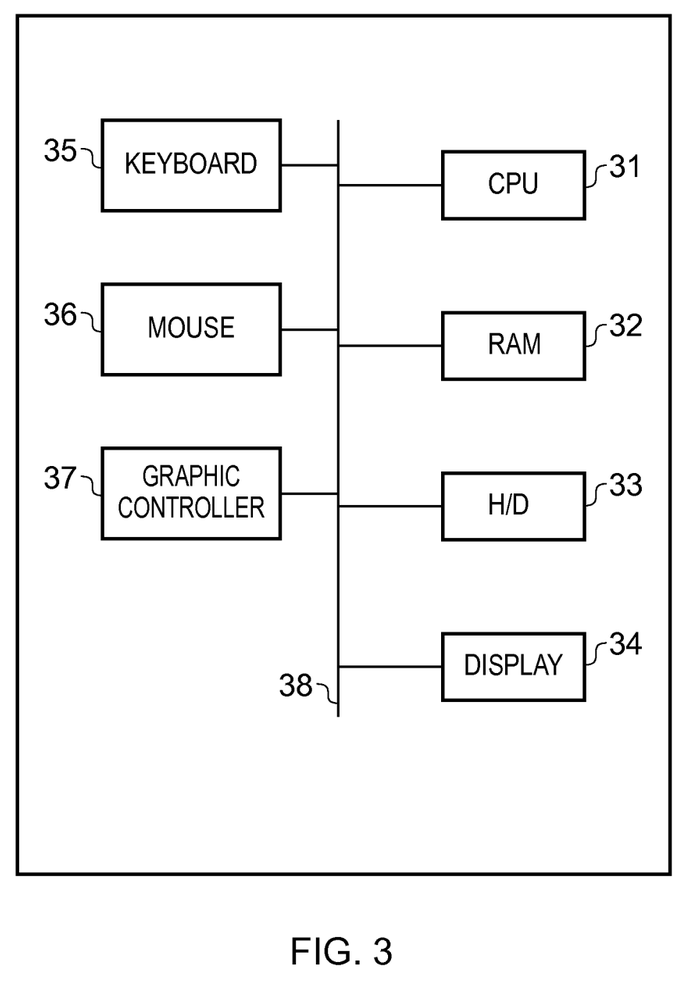
FIG. 3 shows the hardware configuration of servers and client computers.

The web-submission servers 107a, 107b, 107c, printer server 102, and clients 105a, 105b, 105c all have a similar computer hardware structure, which is shown in FIG. 3. The computers comprise a CPU 30, random access memory (RAM) 32, a hard disk 33, a display 34, a keyboard 35, a mouse 36, and a graphics controller 37 connected to each other by a bus 38. The CPU 31 is a processor of the type manufactured by Intel® or AMD®. The RAM 32 provides a storage area for the CPU 30 to store data in. The hard disk 33 provides a non-volatile storage area for programs, data in databases, and any other data stored on the server or client. The display is a VDU, such as a liquid crystal display (LCD) or the like, and enables a user to interact with the computer via a graphical user interface. The keyboard 35 is a standard keyboard for entry of text or other commands. The mouse 36 is a pointing device as is well known in the art. The graphic controller 37 is provided to generate graphics for display on the display 34.

Figure 4:
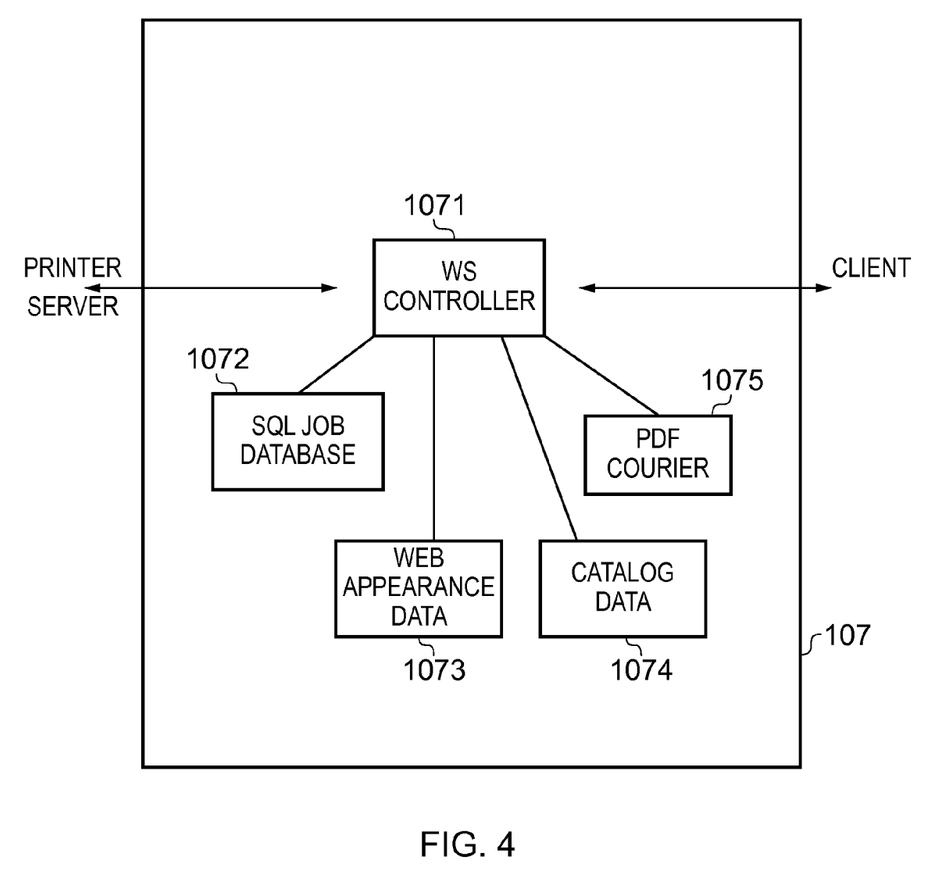
FIG. 4 shows software on a web-submission server.

FIG. 4 schematically shows software on each web-submission server 107. An operating system is installed on the web-submission server 107. Installed with the operating system is Apache server software with support for PHP, a well known server-side scripting language. A web-submission (WS) controller 1071 coded in PHP is provided which controls submission of print jobs to the web-submission server. The WS controller 1071 is coded to dynamically generate HTML pages to be sent to clients 105a, 105b, 105c in response to requests received from those clients 105. These web pages form a website hosted by the web-submission server 107. Also installed on the web-submission server 107 is a SQL job database 1072 for storing jobs submitted to the web-submission server 107, web appearance data 1073 which is used to customise the appearance of web pages provided to clients 105, catalogue data 1074 which is data representing various print products that may be ordered via the print management system 100, and 'PDF courier' 1075 which is an application for generating PDF previews of submitted print jobs.

Figure 5:
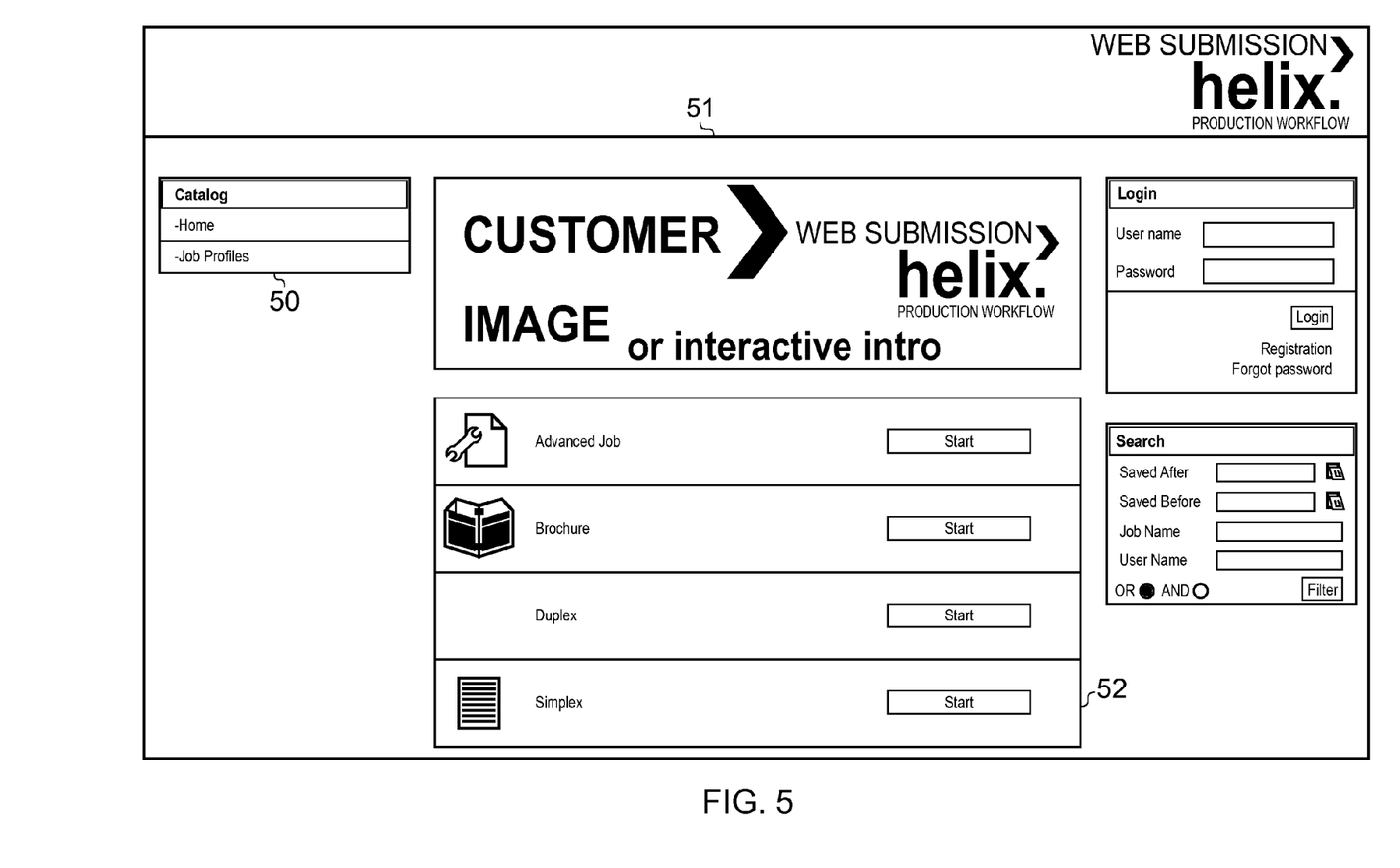
FIG. 5 shows a screen of a web interface provided by the web-submission server.

FIG. 5 shows a job-profiles page that forms part of the website hosted by the web-submission server 107. The job-profiles page includes five main elements. On the left-hand side is a navigation menu 50, which enables a user to see where he or she is in the website. The navigation menu 50 shown in FIG. 5 indicates that the user is on the job profiles page.

At the top of the centre of the page is a customizable image pane 51. The image displayed in the image pane 51 is customizable and is stored on the web-submission server 107 as part of the web appearance data 1073. The image in image pane 51 could be selected to be a company logo, for example. In an alternative embodiment, the image pane 51 is configured to display an image from a source external to the web-submission server 107, such as an image or page from another website.

Below the image pane 51 is a list of job profiles 52. The job profiles included in the list are "advanced job", "brochure", "duplex", and "simplex". If a user selects one of the job profiles, the web-submission server 107 sends HTML pages that are displayed at the client 105 to guide a customer through the process of submitting a print job to the web-submission server 107. The "simplex" job profile will guide a user through submitting a print job that is to be printed single-sided. The "duplex" job profile will guide a user through submitting a print job that is to be printed double-sided. The "brochure" job profile will guide a user through submitting a print job that is to be printed in the format of a brochure i.e. in a booklet format. The "advanced job" profile is configurable to allow other print formats to be selected. For example, the "advanced job" profile may allow submission of a print job to be printed on a T-shirt or a mug. Detailed explanation of the pages displayed in each of the different profiles is unnecessary for understanding of the present invention.

Figure 6:
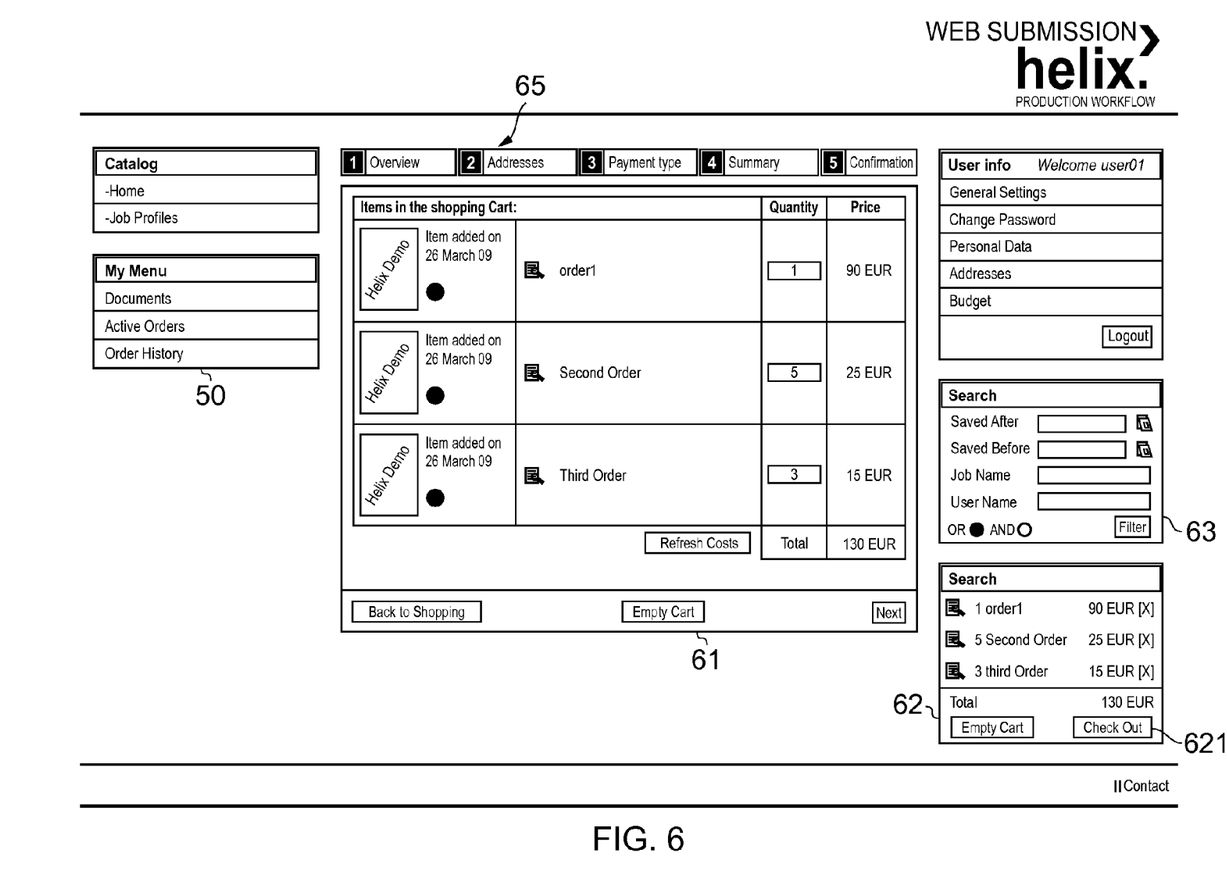
FIG. 6 shows a further screen of the web interface provided by the web-submission server.

FIG. 6 shows a shopping cart web page generated by the web-submission server 107. The page includes the navigation menu 50, described in connection with FIG. 5, a list pane 61 showing a list of print jobs selected by a user for submission to the print management system 100, and a summary pane 62 showing similar information to the list pane 61. The shopping cart page also includes a search tool 63 for searching for print jobs in the shopping cart, which is useful in a case where a large number of print jobs are to be submitted to the print management system 100; and a checkout navigation pane 64 for navigating between screens to enter user information relating to the user submitting the print jobs in the shopping cart.

Description of Print Server 102

Figure 7:
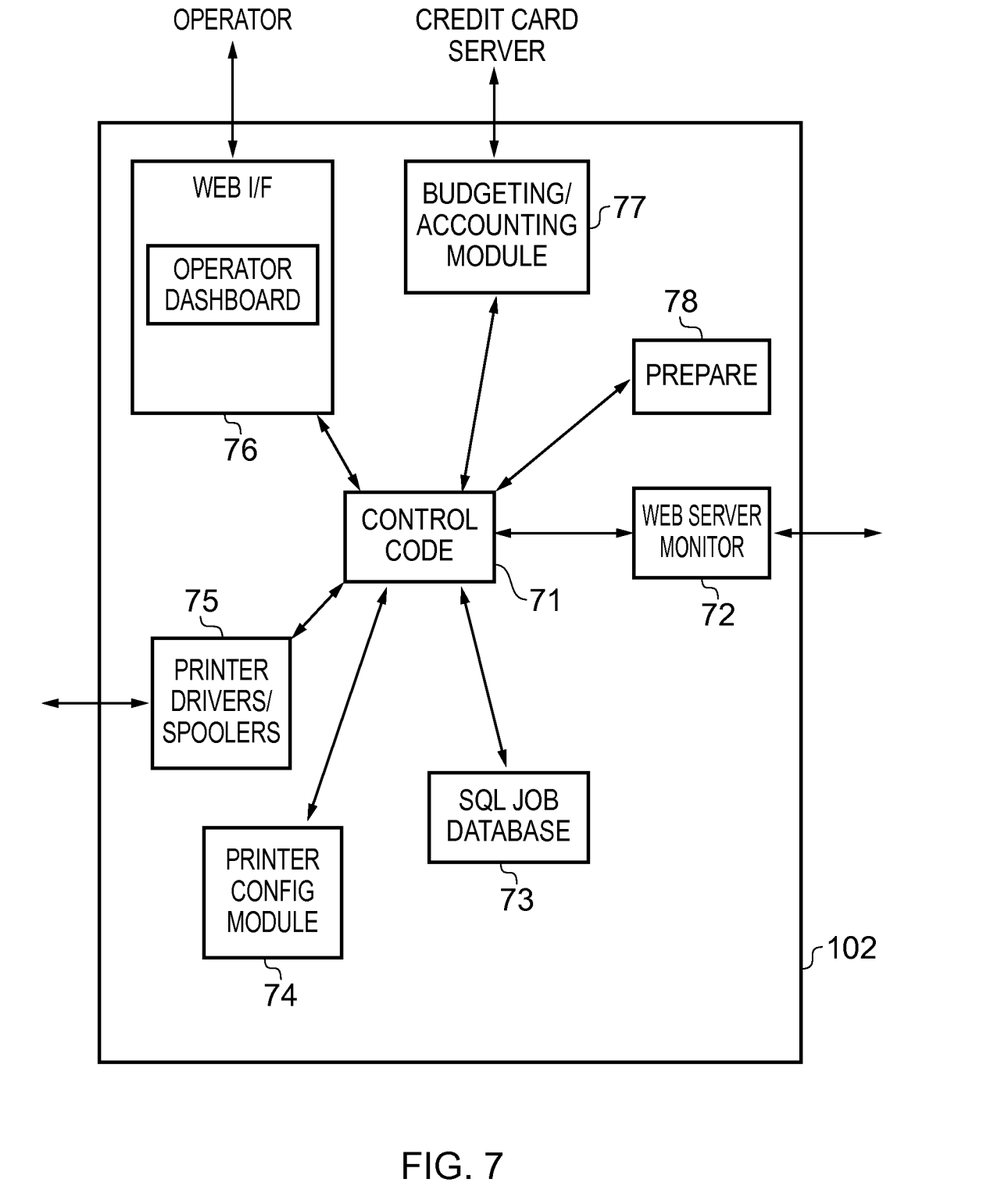
FIG. 7 shows software on a print server.

FIG. 7 shows software configured on the print server 102. The print server has the following software: an operating system (such as Windows server 2008®); control code 71, which controls the software on the print server 102, including calling the other software; a web server monitor 72, which communicates with the web-submission servers 107 as will be explained in more detail below; a SQL job database 73, which stores jobs submitted to the print server 102; a printer configuration module 74, which allows a user to configure the printers 104 so that the print job server 102 can communicate with the printers 104; printer drivers/spoolers 75 which are used to communicate with the printers 104; a web interface 76 to allow a user to remotely access functions of the print server 102 via a network such as from the operator terminal 106; a budgeting/accounting module 77 that manages the cost of printing jobs on the print management system 100 in association with configured user accounts; and 'prepare' 78, which is a program for editing print job settings.

The operation of the above-mentioned software will be described in more detail to the extent that it is relevant to the present invention.

Description of Communication Between the Print Server and a Web-Submission Server The print server 102 communicates with the web-submission servers 107 via the firewall 103. This method of communication is more secure than if the print server 102 were to accept print jobs from the clients 105 directly viat the Internet 3. The print server 102 is used to store private and sensitive data, such as budgeting and accounting information and user details. The web-submission servers 107 are used to provide HTML pages to end users at the clients 105 and to accept print jobs.

Print jobs can also be submitted by a user 108 directly to the print server 102 from behind the firewall 103. This may be done for example when the user 108 is an employee of a company that runs the print management system 100.

A use of the print management system 100 is as follows. A customer, in this example client 105*a*, wishes to submit a print job. To do this, client 105*a* communicates with a web-submission server 107, in this example web-submission server 107*a*. Web-submission server 107*a* provides HTML pages of a website as previously described in connection with FIGS. 5 and 6, which the customer 105*a* uses to submit a print job to the web-submission server 107.

The print server 102 periodically sends requests to the web-submission server 107 to cause the web-submission server 107 to send any print jobs it has received to the print server 102. The web-submission server 107*a* then sends any stored print jobs to the print server 102 in response to a request from the print server 102.

When the print server 102 receives the print job it stores the print job in the SQL job database 73.

Print jobs sent by a customer to the print server 102 may be subjected to checking prior to being printed. An example of this is known as a "pre-flight", where a print job undergoes an automated check to see if it satisfies certain pre-defined quality criteria, such as all images being of sufficient resolution and all fonts required by the print job being available. A pre-flight evaluation report can then be provided to the client 105 and/or a print-room operator to allow any problems to be identified and rectified. Print jobs may also be checked to confirm that they satisfy certain further requirements that may be configured on the print server 102. For example, a check could be performed to see that all jobs are black and white in a case where colour printing is unavailable.

Description of Operator Dashboard

The print jobs in the SQL job database 73 may be manually checked and sent to printers by the print-room operator at the operator terminal 106. The print-room operator can access the print server 102 via the web interface 76 and can control print jobs via an operator dashboard displayed on web pages sent to the operator terminal 106. The operator dashboard in shown in FIG. 8.

Figure 8:
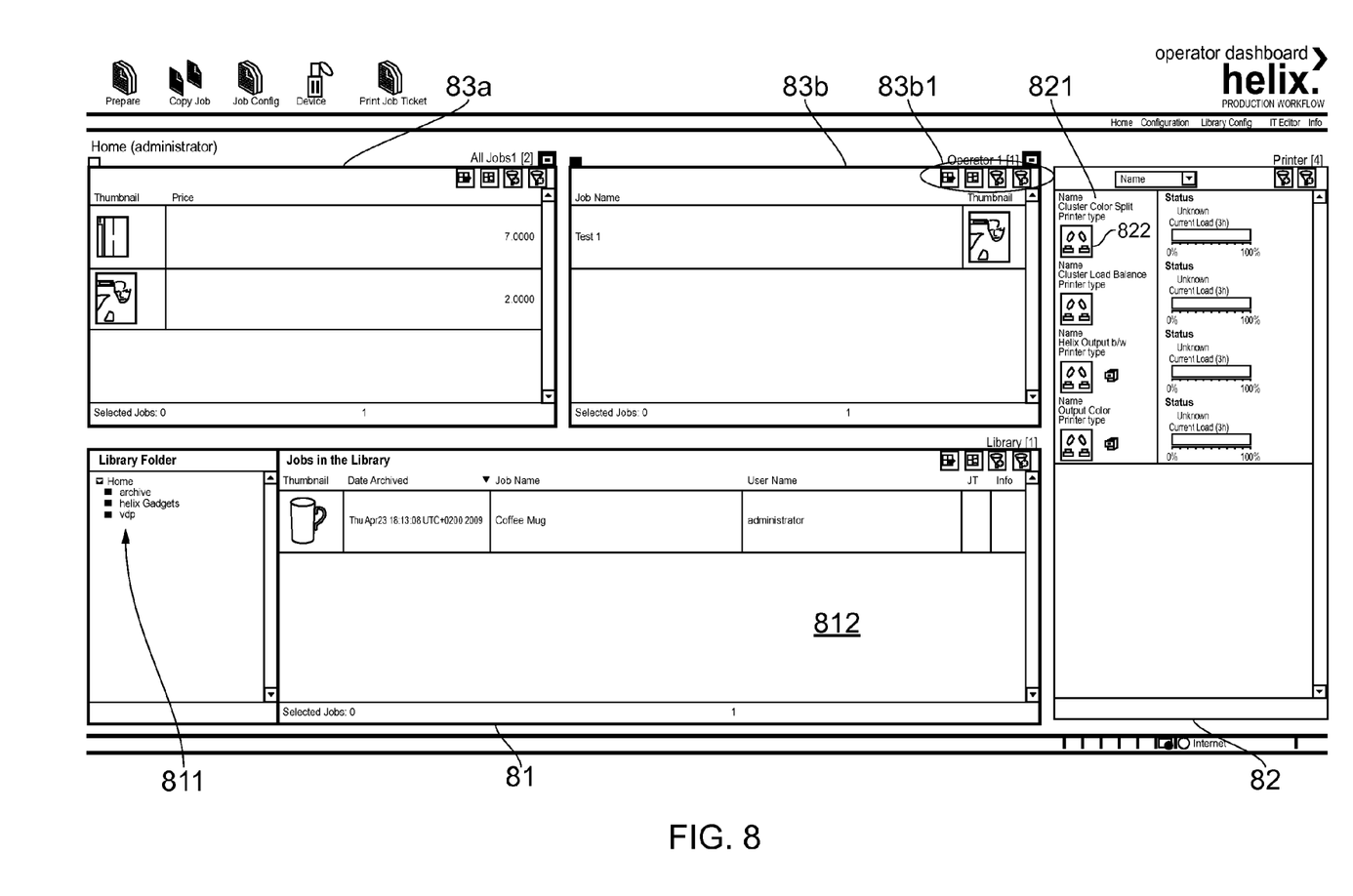
FIG. 8 shows an operator dashboard.

FIG. 8 shows the operator dashboard, which comprises a library pane 81, a printer pane 82, and two user panes 83. The two user panes 83 consist of an administrator pane 83*a* and an operator pane 83*b*. The administrator pane 83*a* shows all print jobs stored on the print server 102. In contrast, operator pane 83*b* shows print jobs filtered in accordance with settings made by the operator for processing.

The operator may open a print job in the operator pane 83*b* using 'prepare' 78 in order to perform adjustments to the print job such as selecting the media on which the print job is to be printed, etc. Finishing operations that can be set in connection with print jobs are known in the art and so are not described in detail here.

Printer pane 82 includes a list of printers configured on the print job server 102. Each printer entry in the list includes a name 821 and an icon indicating its type 822 and a load bar indicating the current load of the corresponding printer 104. The load of the printer corresponds to the time that it will take the printer 104 to print all the print jobs currently assigned to it, with 100% load representing 3 hours printing time.

The library pane 81 is provided to allow the operator to store print jobs for future reference. The library pane shows a file hierarchy 811 that allows the operator to select particular job storage areas, and a job display portion 812 that displays jobs stored in the selected job storage areas. The operator may archive print jobs by selecting the appropriate job storage area in the file hierarchy 811 and then dragging a print job from the operator pane 83*b* to the job display portion 812.

In use the operator can drag a print job from the operator pane 83*b* to a printer icon 822 displayed on the printer pane 82. In response to this operation the selected print job is extracted from the SQL job database 73 and sent to the printer driver/spooler 75 corresponding to that printer icon. The print job is then converted into an appropriate page description language, queued, and sent to the printer 104.

The operator may adjust the manner in which print jobs are displayed on the operator pane 83*b*. Display options for the operator pane 83*b* are settable via a configuration screen (not shown). The configuration screen allows the operator to set information to be displayed in connection with each print job on the operator pane 83*b*. In FIG. 8 columns of information displayed in connection with print jobs include a thumbnail of the print job and the job name. The administrator pane 83*a* is configured to display a thumbnail for each print job and the price of the print job. The user may configure the user panes 83 to include other columns showing such things as a number of pages in a print job and whether or not the print job is a colour print job.

A further item that the operator may configure is which print jobs are shown in the list of jobs shown in the operator pane 83*b*. For example, the operator may set filtering criteria in connection with the following parameters: status, cost centre, paper catalogue, booklet printing, duplex, staple, hole punch, colour print, cut, collate, fold, perforate, glue binding, and ring binding. Thus, for example, the operator may filter the displayed list so that only print jobs assigned to a particular cost centre (e.g. company x's account) are displayed in the operator pane 83b. Alternatively, the operator could set the list to display only those print jobs that require glue binding. Other filters based on the aforementioned criteria can be set.

Once the operator pane 83b has been configured, the user may wish to perform certain operations in the list of print jobs. In the top right hand corner of the operator pane 83b are provided a plurality of symbols 83b1 for control of print jobs displayed in the operator pane 83b. The symbols are shown more clearly and will now be explained in connection with FIG. 9. The top-most symbol shown in FIG. 9, which looks like a funnel with a plus sign, allows the operator to further filter the print jobs displayed in the operator pane 83b. For example, the operator may already have configured the operator pane 83b to only display jobs assigned to a particular cost centre. By selecting the further filter symbol, the operator is provided with a menu to allow further filtering of the print jobs. For example, the operator may decide to further restrict the display to only those print jobs that require booklet printing.

Figure 9:
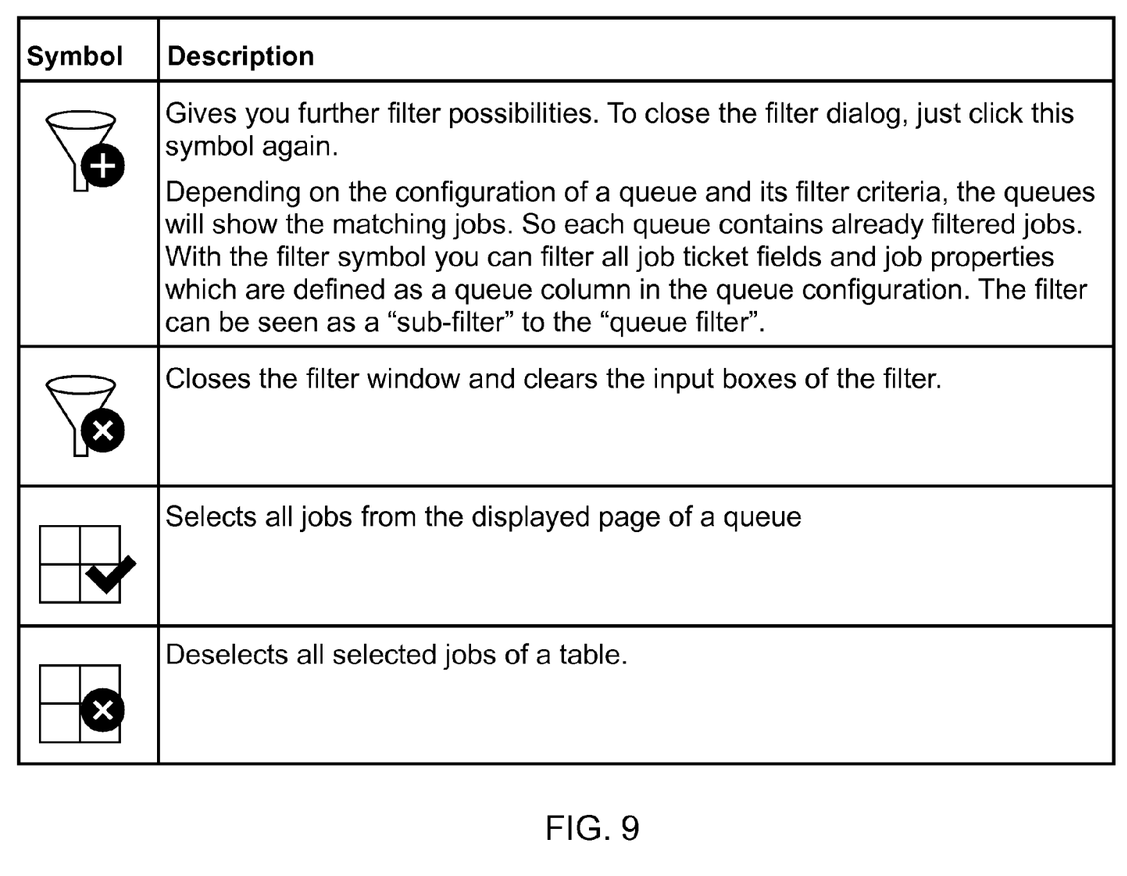
FIG. 9 shows in more detail symbols shown on the operator dashboard.

The second symbol shown in FIG. 9, which looks like a funnel with a cross, closes the operator pane 83b and clears the filter settings assigned to the operator pane 83b.

The third symbol shown in FIG. 9, which looks like a grid with a tick, allows the operator to select all print jobs listed in the operator pane 83b. This is convenient because it allows the operator, who may have previously filtered the list of print jobs to those that he or she is interested in, to select all the print jobs. The selected print jobs may, for example, then be dragged and dropped on a printer icon 822 in the printer pane 82.

The fourth symbol shown in FIG. 9, which looks like a grid with a cross, allows a user to deselect all the print jobs displayed in the operator pane 83b.

The above operations have been described in connection with the operator pane 83b. However, similar configuration steps may be performed in connection with the administrator pane 83a. Further additional user panes 83 may be created and configured as desired.

As explained above, the second prior art print system 100 is only able to display a filtered list of print jobs in a user pane 83b according to the following criteria: status, cost centre, paper catalogue, booklet printing, duplex, staple, hole punch, colour print, cut, collate, fold, perforate, glue binding, and ring binding. Further, as explained in connection with FIG. 2, print jobs may be submitted to the print server 102 via any one of a plurality of web-submission servers 107a to 107c and consequently via any one of a plurality of different websites provided by those web-submission servers 107.

It is an object of the present invention to provide a mechanism for allowing print jobs to be filtered based on the web-submission server 107 from which the print job was received. It is a further object of the present invention to allow an operator to process received print jobs in a different manner in dependence upon the source web-submission server or website.

SUMMARY OF INVENTION

According to a first aspect of the present invention there is provided a print-management system comprising: a plurality of web-submission servers, each web-submission server hosting a website configured to allow submission of print jobs to the print management system; and a print server configured to receive print jobs from the plurality of web-submission servers, process the print jobs, and send print jobs to at least one printer to be printed; wherein the print management system is configured to add an identifier to each received print job to identify the web-submission server or website that received the print job; and wherein the print server is configured so that print jobs are processed based on the identifiers added to the print jobs.

According to a second aspect of the present invention there is provided a print-management method for a print management system comprising a plurality of web-submission servers and a print server, the method comprising: each web-submission server hosting a website configured to allow submission of print jobs to the print management system; adding an identifier to each received print job to identify the web-submission server or website that received the print job; receiving at the print server print jobs from the plurality of web-submission servers; processing the print jobs at the print server such that print jobs are processed based on the identifiers added to the print jobs; and sending print jobs from the print server to one or more printers to be printed.

According to a third aspect of the present invention there is provided a non-transitory computer-readable storage medium storing: instructions to allow submission via a website hosted on a web-submission server of print jobs to the print management system; instructions to add an identifier to each received print job to identify the web-submission server or website that received the print job; instructions to cause the print server to receive at the print jobs from the plurality of web-submission servers; instructions to cause the print server to process the print jobs such that each print job is processed based on the identifier added to the print job; and instructions to cause the print server to send the print jobs to one or more printers to be printed.

According to a fourth aspect of the present invention there is provided a print server configured to communicate with a plurality of web-submission servers, each web-submission server hosting a website configured to allow submission of print jobs and being configured to add an identifier to each received print job to identify the web-submission server or website that received the print job, the print server being configured to: receive print jobs from the plurality of web-submission servers; process the print jobs based on the identifiers added to the print jobs; and send the print jobs to one or more printers to be printed.

According to a fifth aspect of the present invention there is provided A print server configured to communicate with a plurality of web-submission servers, each web-submission server hosting a website configured to allow submission of print jobs, the print server being configured to: receive print jobs from the plurality of web-submission servers; add an identifier to each received print job to identify the web-submission server or website that received each print job; process each print job based on the identifier added to the print job; and send the print jobs to one or more printers to be printed.

According to a sixth aspect of the present invention there is provided a web-submission server configured to communicate with a print server, the web submission server hosting a website configured to allow submission of print jobs, the web-submission server being configured to: add an identifier to a received print job to identify the web-submission server or website that received the print job; and transfer the print job to the print server for processing based on the identifier added to the print job.

DESCRIPTION OF DRAWINGS

The present invention will now be described, by way of example only with reference to the following drawings in which.

DESCRIPTION OF THE EMBODIMENTS

A print system 100 of a first embodiment is similar to the print system 100 described above in connection with FIGS. 2 to 9. For the sake of brevity, the description provided in the introductory portion of this patent specification will not be repeated and only the differences will be described.

Figure 10:
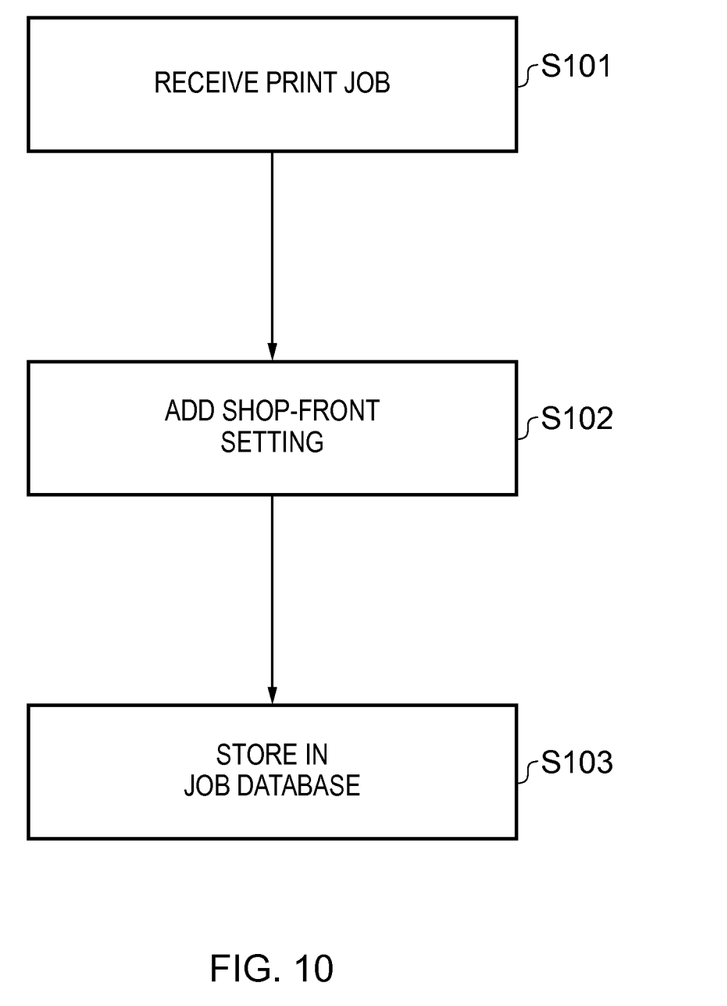
FIG. 10 is a flow chart showing steps performed by the web submission server in the first embodiment of the present invention.

In the first embodiment, a print setting is added to the print job when it is received from the client 105 at the web-submission server 107. The steps performed by the web-submission server are shown in FIG. 10. In step S101, the web-submission server 107 receives the print job from the client 105. As previously described, the print job includes the data to be printed and print settings (printing options) associated with the print data. In step S102, the web-submission server adds an identifier to the print settings indicating the website via which the print job was received. In step S103, the web-submission server 107 stores the edited print job in the SQL job database 1072. In the first embodiment the identifier is the URL of the web-submission server 107.

The identifier added to the print job may alternately be an identifier indicating the identity of the web-submission server 107 receiving the print job. The purpose of the identifier added to the print job is to identify the website by which the print job was added to the print management system.

The print jobs received at the web-submission servers 107 are retrieved by the print server 102 in the manner described above in the background section and are stored in the SQL job database 73.

In the first embodiment, an additional criterion is provided as a filter for use in connection with the list of print jobs displayed on the operator pane 83b. The criterion corresponds to the identifier added to the print job by the web-submission server 107. The operator may configure the operator pane 83b to only display print jobs submitted via one or more selected websites or selected web-submission servers 107. In response to such a configuration, the web interface 76 searches the SQL job database 73 for print jobs having an identifier corresponding to the websites selected by the operator, and then enters the list of print jobs found in the operator dashboard that is sent to the operator terminal 106. In other embodiments, a name corresponding to the web-submission server may be displayed instead of the identifier. The name of the web-submission server may be user configurable for each web-submission server 107; the user selected name being configured for each web submission server URL.

Further, the operator pane 83b may be configured to display the identifier in a column of information of the listed print jobs. In this case, when the web interface extracts print jobs from the SQL database 73 to generate the list of print jobs in the operator dashboard 83b, it also extracts the identifier from the SQL database 73 and displays the identifier along with the other extracted job information in the operator pane 83b.

Alternatively or in addition, the operator pane 83b may be configured so that the list of print jobs is sorted based on the website via which the print job was received. In this case, the web interface extracts the identifiers for the jobs to be displayed in the operator pane 83b from the SQL database 73 and then orders the print jobs for display on the operator pane 83b alphabetically based on the extracted identifiers or user configured web-submission server names. In other embodiments the print jobs may be sorted by some other scheme based on the extracted identifiers or user-configured web-submission server names.

The first embodiment is advantageous because the operator is able to adjust the display of print jobs in order to easily see which print jobs originated from which website/web-submission server 107. Further, provided with this information, the operator can easily allocate print jobs to printers based on the website via which the print job was received.

Figure 11:
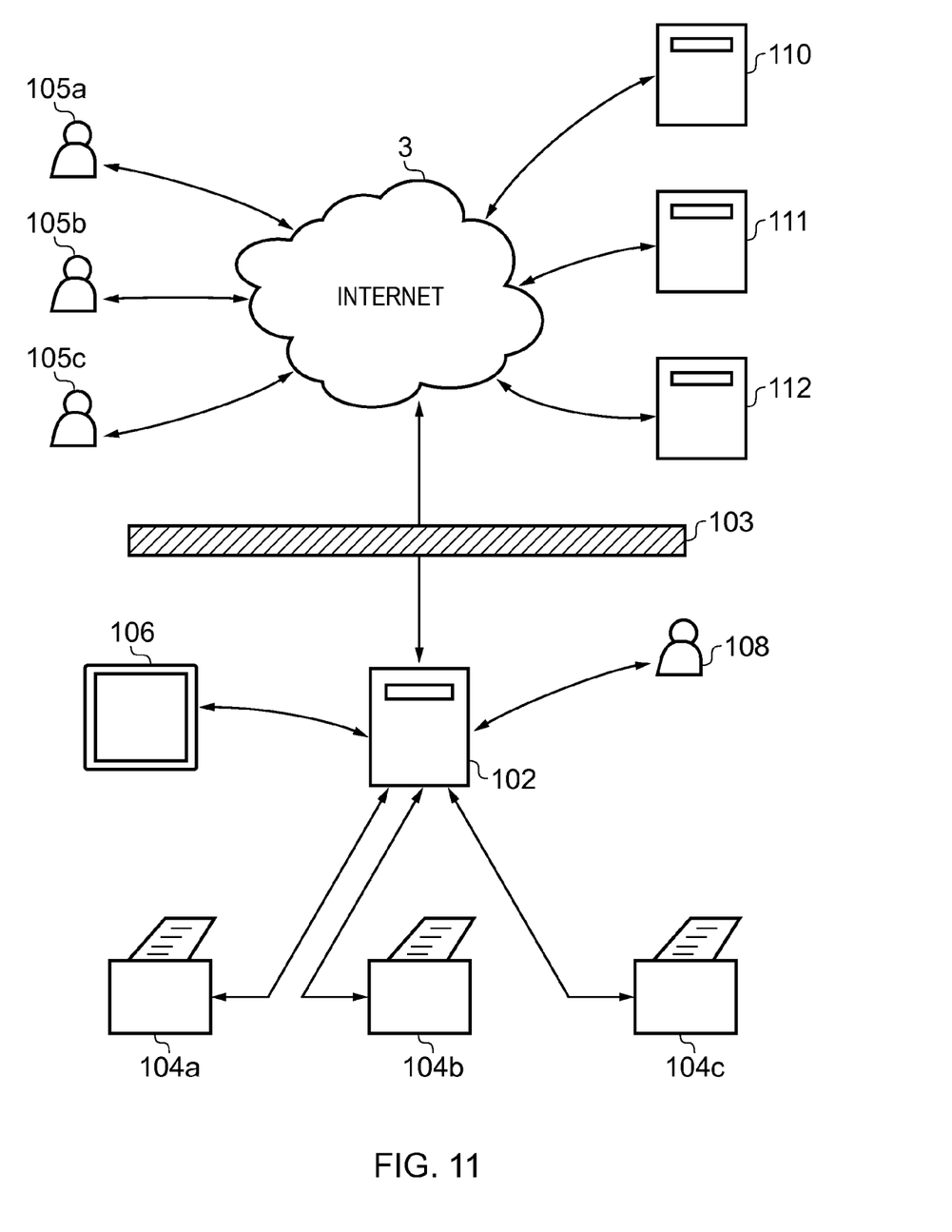
FIG. 11 is a diagram showing the configuration of the second embodiment of the present invention.

A second embodiment of the present invention will be described with reference to FIG. 11. Differences between the first embodiment and the second embodiment will now be described.

The print management system of the second embodiment includes a first web-submission server 110, a second web-submission server 111, and a third web-submission server 112. The first web-submission server 110 hosts a web site for use by private clients who occasionally submit print jobs. The second web-submission server 111 hosts a web site for use by corporate clients who regularly submit print jobs to the print management system 100. The third web-submission server 112 is provided for a large corporate client, which submits a lot of print jobs to the print management system 100. In this embodiment the large corporate client is provided with a dedicated website to allow submission of print jobs to the print server 102.

The first web-submission server 110 hosts a website similar to that previously described in connection with FIGS. 5 and 6. In a case that a client 105 clicks on the 'check out' button 621 on the summary pane 62 of the shopping-cart web page shown in FIG. 6, the first web-submission server 110 re-directs the client 105 to a third party credit card payment site to allow entry of payment details to pay for the services ordered. This configuration is particularly convenient for retail clients, from whom payment is required before print services are provided.

The second web-submission server 111 also hosts a website similar to that previously described in connection with FIGS. 5 and 6. In a case that a client 105 clicks on the 'check out' button 621 on the summary pane 62 shown in FIG. 6, the second web-submission server 111 sends an HTML page to the client 105 to allow the client 105 to enter company and account details. These details are then submitted with the print job as part of the print job settings. When the print job is transferred from the web-submission server 111 to the print server 102, the charging details are extracted from the print job settings by the budgeting and accounting module 77 and the cost of the print job is recorded against a corporate account corresponding to the details entered by the client 105. In this way, an invoice can be periodically issued from the budgeting/accounting module 77 to the client allowing corporate clients to pay for their print jobs periodically on the basis of issued invoices.

The website hosted on the third web-submission server 112 can be customised according to the large corporate client's requests. In particular, the job profiles page shown in FIG. 5 is customised to include the particular types of print job that the large corporate client 105 wishes to print on the print management system 100.

In the second embodiment, the large corporate client supplies a large volume of print jobs to the print management system 100 and the print server 102 is configured so that the operator 106 does not need to manually transfer print jobs received from the third web-submission server 112 to printers 104. The control code 71 is configured with an automatic routing rule to route print jobs having print settings corresponding to the profiles on the website hosted by the third web-submission server 112 and a setting indicating that the print job originates from the third web-submission server 112 to particular pre-assigned printers 104 without being manually transferred by the operator 106.

An operator operating the operator dashboard according to the second embodiment may choose to preferentially assign print jobs from either the first or second web-submission servers 110, 111 to printers. For example, the print management system owners may wish to ensure that their corporate clients always receive a fast and reliable service. Accordingly, the operator may choose to configure a first operator pane to show only print jobs received from the second web-submission server 112. The operator may assign print jobs from the second web-submission server to appropriate printers as soon as the operator notices that a print job has arrived and is displayed in the first operator pane, ensuring that print jobs received from the second web-submission server 112 are promptly allocated to printers for printing. Print jobs received from the first web-submission server may be displayed on a second configured operator pane, either with print jobs from the first web-submission server 111 or on their own, and can be allocated by the operator to the printers in such a manner as to make efficient use of the available printers. In this way, print jobs from the second web-submission server 112 can be preferentially assigned to printers over print jobs from the first web-submission server 111.

A further feature of the second embodiment is an enhancement of the budgeting/accounting module 77. As described above, a function of the budgeting/accounting module 77 is to allow the print jobs printed by the print management system 100 to be tracked and, where appropriate, invoices issued. In the second embodiment, the budgeting/accounting module 77 records the identifier of the print jobs printed using the print management system 100. Using this information, the owner of the print management system 100 can receive a report of the number of print jobs processed via each of the web-submission servers 110, 111, and 112.

In the first and second embodiments the identifier is added to the print job by the web-submission server 107, 111, 112, 113. However, in a third embodiment of the present invention the identifier may be added to the print job at the print server 102. It is recalled that the print jobs received at the web-submission servers 107, 111, 112, and 113 are forwarded to the print server 102 in response to requests from the printer server 102. Accordingly, when the print server 102 receives the print jobs from the web-submission servers 107, 111, 112, or 113, the print server can determine which web-submission server 107, 111, 112, and 113 sent the print job. As each web-submission server 107, 111, 112, and 113 hosts only one website, in the third embodiment the print server 102 adds the identifier identifying the source web-submission server or website of the print job.

Embodiments of the present invention have been described above. Further embodiments of the present invention can also be realized by a print management system (or devices such as a CPU or MPU inside the print managing system) that reads out and executes a program recorded on a memory device to perform the functions of the above-described embodiment(s), and by a method, the steps of which are performed by, for example, reading out and executing a program recorded on a memory device to perform the functions of the above-described embodiment(s). For this purpose, the program may be provided to the print management system for example via a network or from a recording medium of various types serving as the memory device (e.g., computer-readable medium).

The invention claimed is:

1. A print-management system comprising:
a plurality of web-submission servers, each web-submission server hosting a website configured to allow submission of print jobs to the print management system; and
a print server configured to receive print jobs from the plurality of web-submission servers, process the print jobs, and send print jobs to at least one printer to be printed,
wherein the print-management system is configured to add an identifier to each received print job to identify the website that received the print job,
wherein the print server is configured so that print jobs are processed based on the identifiers of the website added to the print jobs,
wherein the print server is configured so that print jobs received from one or more web-submission servers are manually assigned to printers by an operator based on a result of a first filtering and a second filtering, or the print server is configured to automatically route print jobs received from one or more web-submission servers to printers based on a result of a first filtering and a second filtering, and
wherein the first filtering for routing the print jobs for printing is performed on the print jobs based on a first filtering criterion, the first filtering criterion being the respective identifier of the website added to each of the print jobs, and, after the first filtering is performed, a second filtering criterion is entered and the second filtering for routing the print jobs for printing is performed on the print jobs based on the second filtering criterion.

2. The print-management system according to claim 1, wherein the print server is configured to provide an interface via which an operator can manually process the print jobs received from the web-submission servers, the interface comprising a facility for selectively listing print jobs stored on the print server having a particular identifier.

3. The print-management system according to claim 1, wherein the print server is configured to provide an interface via which an operator can manually process the print jobs received from the web-submission servers, the interface being configured to display a list of print jobs stored on the print server along with their identifiers or names associated with their identifiers, wherein each identifier identifies the website that received the print job.

4. The print-management system according to claim 1, wherein the print server is configured to provide an interface via which an operator can manually process print jobs received from the web-submission servers, the interface being configured to display a list of print jobs sorted in accordance with their identifiers or names associated with their identifiers, wherein each identifier identifies the website that received the print job.

5. The print-management system according to claim 1, wherein the print server is operable to preferentially assign print jobs received from a first website of the first web-submission server to printers over print-jobs received from a second website of the second web-submission server.

6. A print-management method for a print management system comprising a plurality of web-submission servers and a print server, the method comprising:
 hosting, on each web-submission server, a website configured to allow submission of print jobs to the print management system;
 adding an identifier to each received print job to identify the website that received the print job;
 receiving at the print server print jobs from the plurality of web-submission servers;
 processing the print jobs at the print server such that print jobs are processed based on the identifiers of the website added to the print jobs;
 first filtering, the first filtering being for routing the print jobs for printing, the print jobs based on a first filtering criterion, the first filtering criterion being the respective identifier of the website added to each of the print jobs;
 after the first filtering is performed, entering a second filtering criterion and second filtering, the second filtering being for routing the print jobs for printing, the print jobs based on the second filtering criterion; and
 sending print jobs from the print server to one or more printers to be printed,
 wherein print jobs received from one or more web-submission servers are manually assigned to printers by an operator based on a result of the first filtering and the second filtering, or the print jobs received from one or more web-submission servers are automatically routed to printers based on a result of the first filtering and the second filtering.

7. The method according to claim 6 further wherein the operator manually preferentially assigns print jobs received from a first website of a first web-submission server to printers over print jobs received from a second website of a second web-submission server.

8. A non-transitory computer-readable storage medium storing:
 instructions to allow submission, via a website hosted on a web-submission server of a plurality of web-submission servers, of print jobs to a print management system comprising the plurality of web-submission servers and a print server;
 instructions to add an identifier to each received print job to identify the website that received a print job;
 instructions to cause the print server to receive the print jobs from the plurality of web-submission servers;
 instructions to cause the print server to process the print jobs such that each print job is processed based on the identifier of the website added to the print job; and
 instructions to cause the print server to send the print jobs to one or more printers to be printed,
 wherein the instructions to cause the print server to send the print jobs to one or more printers to be printed include instructions such that print jobs received from one or more web-submission servers are manually assigned to printers by an operator based on a result of a first filtering and a second filtering, or instructions such that the print jobs received from one or more web-submission servers are automatically routed to printers based on a result of a first filtering and a second filtering, and
 wherein the first filtering for routing the print jobs for printing is performed on the print jobs based on a first filtering criterion, the first filtering criterion being the respective identifier of the website added to each of the print jobs, and, after the first filtering is performed, a second filtering criterion is entered and the second filtering for routing the print jobs for printing is performed on the print jobs based on the second filtering criterion.

9. A print server configured to communicate with a plurality of web-submission servers, each web-submission server hosting a website configured to allow submission of print jobs and being configured to add an identifier to each received print job to identify the website that received the print job, the print server being configured to:
 receive print jobs from the plurality of web-submission servers;
 process the print jobs based on the identifiers of the website added to the print jobs;
 first filter, the first filtering being for routing the print jobs for printing, the print jobs based on a first filtering criterion, the first filtering criterion being the respective identifier of the website added to each of the print jobs;
 after the first filtering is performed, enter a second filtering criterion and second filter, the second filtering being for routing the print jobs for printing, the print jobs based on the second filtering criterion; and
 send the print jobs to one or more printers to be printed,
 wherein print jobs received from one or more web-submission servers are manually assigned to printers by an operator based on a result of the first filtering and the second filtering, or the print jobs received from one or more web-submission servers are automatically routed to printers based on a result of the first filtering and the second filtering.

10. A print server configured to communicate with a plurality of web-submission servers, each web-submission server hosting a website configured to allow submission of print jobs, the print server being configured to:
 receive print jobs from the plurality of web-submission servers;
 add an identifier to each received print job to identify the website that received the print job;
 process each print job based on the identifier of the website added to the print job;
 first filter, the first filtering being for routing the print jobs for printing, the print jobs based on a first filtering criterion, the first filtering criterion being the respective identifier of the website added to each of the print jobs;
 after the first filtering is performed, enter a second filtering criterion and second filter, the second filtering being for routing the print jobs for printing, the print jobs based on the second filtering criterion; and
 send the print jobs to one or more printers to be printed,
 wherein print jobs received from one or more web-submission servers are manually assigned to printers by an operator based on a result of the first filtering and the second filtering, or the print jobs received from one or more web-submission servers are automatically routed to printers based on a result of the first filtering and the second filtering.

11. A web-submission server configured to communicate with a print server, the web-submission server hosting a website configured to allow submission of print jobs, the web-submission server being configured to:
add an identifier to a received print job to identify the website that received the print job; and
transfer the print job to the print server for processing based on the identifier of the website added to the print job,
wherein print jobs received by the web-submission server or from one or more web-submission servers are manually assigned, by the print server, to printers by an operator based on a result of a first filtering and a second filtering, or the print jobs received by the web-submission server or from one or more web-submission servers are automatically routed, by the print server, to printers based on a result of a first filtering and a second filtering, and
wherein the first filtering for routing the print jobs for printing is performed by the print server on the print jobs based on a first filtering criterion, the first filtering criterion being the respective identifier of the website added to each of the print jobs, and, after the first filtering is performed, a second filtering criterion is entered and the second filtering for routing the print jobs for printing is performed by the print server on the print jobs based on the second filtering criterion.

* * * * *